United States Patent [19]

Udert et al.

[11] 4,235,151
[45] Nov. 25, 1980

[54] EXPANSION DOWEL

[75] Inventors: Karl E. Udert, Triesen; Hans Oechsle, Nenzing; Heinz Pfeiffer, Gisingen, all of Austria

[73] Assignee: Hilti Aktiengesellschaft, Schaan, Liechtenstein

[21] Appl. No.: 910,016

[22] Filed: May 26, 1978

Related U.S. Application Data

[63] Continuation of Ser. No. 787,794, Apr. 15, 1977, abandoned.

[30] Foreign Application Priority Data

Apr. 20, 1976 [DE] Fed. Rep. of Germany ....... 2617191

[51] Int. Cl.$^2$ ............................................... F16B 13/06
[52] U.S. Cl. ..................................... 85/84; 151/41.72; 151/41.74
[58] Field of Search .................... 85/82, 83, 84, 72, 85; 151/41.74, 41.73, 31, 41.72

[56] References Cited

U.S. PATENT DOCUMENTS 4,026,187  5/1977  Gross ................................. 85/84 X

FOREIGN PATENT DOCUMENTS 2152729  4/1973  Fed. Rep. of Germany .............. 85/84
1203557  8/1970  United Kingdom ........................ 85/84

Primary Examiner—Rodney H. Bonck
Attorney, Agent, or Firm—Toren, McGeady and Stanger

[57] ABSTRACT

An expansion dowel consists of an axially extending sleeve slotted for a part of its length and an axially extending expansion body insertable into and displaceable through the bore in the sleeve for radially expanding the sleeve. The expansion body has at least one axially extending recess in its outer surface so that the expansion body can deform along the recess after a certain expanding force has been achieved. Further, an axially extending bore can be formed through the expansion body with the recess opening into the bore.

3 Claims, 10 Drawing Figures

EXPANSION DOWEL

This is a continuation of application Ser. No. 787,794 filed on Apr. 15, 1977 and now abandoned.

SUMMARY OF THE INVENTION

The present invention is directed to an expansion dowel consisting of a sleeve slotted over a portion of its axial length, with the bore in the sleeve tapering inwardly toward the end first inserted into a bore hole, and an expansion body displaceable within the bore in the sleeve and having radially deformable regions in its surface.

In a known expansion dowel of the type mentioned above, the expansion body has an axial bore extending therethrough. The cone angle of the truncated cone type expansion body is less than that of the frusto-concially shaped surfaces of the bore in the sleeve. As the expansion body is driven into the tapering bore in the sleeve, the sleeve expands in the radial direction. By weakening the expansion body by means of the axial bore, the expansion body is also deformed, being compressed radially inward. As a result, the truncated cone surface of the expansion body becomes increasingly more blunt and further driving in of the expansion body is rendered difficult. Rearwardly of the expansion body, an inset piece of soft metal, such as lead is provided. During the expanding process, the soft metal is displaced into the slot in the sleeve for preventing the sleeve from springing back in the bore hole.

These dowels do not provide any control on the state of anchoring from the outside. Therefore, to be on the safe side, these dowels are provided with a so-called "path-constant expansion." This means that the expansion body must always be driven into the sleeve for the same predetermined dimension. To assure that the predetermined dimension is reached, special setting tools with offsets appropriately graded in diameter are used. The path-constant expansion, however, has the disadvantage that the conditions effecting individual expansion dowels and the bore holes into which they are placed are not taken into account. If, for example, the receiving material into which the bore hole is formed is of a low strength or if the diameter of the bore hole has been made too large, there is no assurance that by driving the expansion body into the bore hole for a predetermined dimension the required anchoring values of the dowel are achieved. Conversely, if the receiving material is of a high strength or if the diameter of the bore hole is too small, the expansion body may not be able to be driven in a sufficient distance to meet the predetermined dimension. If under such circumstances it is attempted to drive the expansion body in for the full predetermined dimension, there would be the danger of seizing or cold welding between the expansion body and the sleeve. If the bore hole is drilled too close to an edge of the receiving material it might cause damage to the material.

In addition to these external influences, however, the dimensional differences in the dowel itself, resulting because of manufacturing tolerances, also plays a part in the anchoring of the dowel.

Therefore, it is the object of the present invention to provide an expansion dowel which permits the development of substantially constant expansion pressure ratios in the expansion zone of the dowel.

In accordance with the present invention, the difficulties experienced in the known dowels are overcome by providing one or more axially disposed recesses extending substantially along the full axial length of the body. Deformable zones or regions are provided along the recesses without causing any substantial weakening in the expansion body itself. After a certain expansion pressure or force has been reached, any further driving of the expansion body results only in its deformation in the zones along the recesses in the body.

The recesses are particularly appropriate in expansion bodies having at least a portion of the length formed as a truncated cone tapering inwardly toward the leading end of the body, because in dowels utilizing such expansion bodies the maximum expansion pressure can be fully utilized due to the uniform pressure distribution.

In a preferred embodiment of the expansion body it is provided with a plurality of axially extending recesses spaced apart around its circumference. With this arrangement a uniform distribution of the driving forces can be attained. Moreover, the manufacture of such expansion bodies is simple, since drawn sections of appropriate cross section can be used as the starting material.

To facilitate the deformation of the expansion body, the recesses preferably open into a bore extending axially of the expansion body for at least a portion of its length. Accordingly, the expansion body can be deformed at least in part within the elastic range. The necessary driving forces, as well as the resulting stresses in the expansion body, can be accurately determined.

To provide for simple production of the expansion body as well as to afford as large a contact area of the expansion body with the sleeve, it is advantageous to form the recesses as slots extending radially inwardly toward the axial center of the expansion body. In driving such an expansion body into the sleeve, it can continue to deform until the recesses or slots are closed.

In another preferred form of the expansion body in accordance with the present invention, the recess is designed as a V-shaped groove with the junction of the legs of the groove located substantially at the center of the expansion body. Such an expansion body has a very strong radial deformability.

The various features of novelty which characterize the invention are pointed out with particularity in the claims annexed to and forming a part of this disclosure. For a better understanding of the invention, its operating advantages and specific objects attained by its use, references should be had to the accompanying drawings and descriptive matter in which there are illustrated and described preferred embodiments of the invention.

SUMMARY OF THE INVENTION

Figure 1:
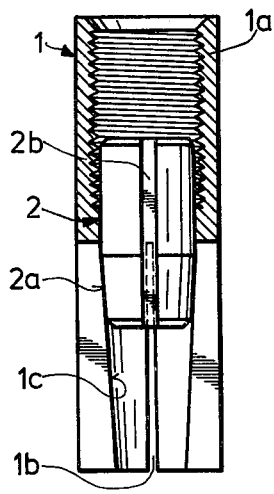
FIG. 1 is an elevational view, partly in section, of an expansion dowel embodying the present invention with the dowel shown in the unexpanded state.

In FIG. 1 an expansion dowel embodying the present invention is illustrated and it consists of an axially extending sleeve 1 and an axially expansion body 2 fitted into the bore within the sleeve. The dowel in FIG. 1 is shown in the unexpanded state, that is, the expansion body is inserted into the bore in the sleeve, however, it has not been driven or axially displaced through the sleeve for effecting expansion of the sleeve. As viewed in FIG. 1 the lower end of the sleeve is its leading or front end, that is, the end first inserted into a bore hole and its opposite end, that is the upper end, is its trailing end. An internal thread 1a is provided within the sleeve extending from its trailing end for a portion of the axial length of the bore. Extending from the leading end of the sleeve 1 are a plurality of axially extending slots 1b extending through the sleeve from its outer surface to the bore. The slots 1b extend for approximately half of the axial length of the sleeve and for that length the bore within the sleeve tapers inwardly to the leading end.

Figure 2:
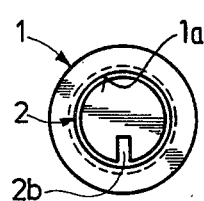
FIG. 2 is a front view of the dowel illustrated in FIG. 1.

The leading part of the expansion body 2, that is the part which is inserted first into the sleeve, has the form of a truncated cone 2a. A recess 2b extends into the outer surface of the expansion body and runs from its leading end to its trailing end. In FIG. 2 the expansion dowel of FIG. 1 is viewed looking downwardly into the sleeve. In this figure it can be seen that the recess 2b is in the form of a radially inwardly extending slot directed toward the axial center of the expansion body 2.

Figure 3:
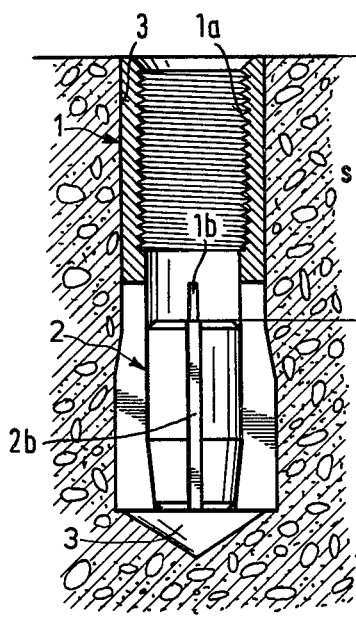
FIG. 3 is a side view, partly in section, of the expansion dowel shown in FIG. 1 driven into a soft receiving material.

In FIG. 3 the expansion dowel of FIG. 1 is in its expanded state within a relatively soft receiving material. The expansion body 2 has been driven toward the leading end of the sleeve 1 so that the axial dimension between the trailing end of the sleeve and the trailing end of the expansion body is "s". The displacement of the expansion body through sleeve has resulted in a maximum widening of the sleeve into contact with the surface of the receiving material lining the bore hole 3. The maximum expansion of the sleeve is, however, possible only if the strength of the receiving material does not exceed a certain value or the bore hole 3 is drilled to the respective size. In this embodiment there has been no deformation of the expansion body 2.

Figure 4:
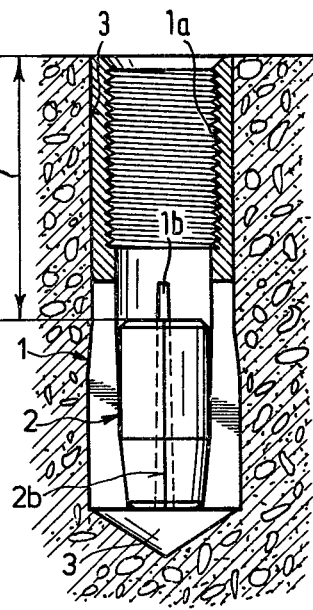
FIG. 4 is a view similar to FIG. 3 showing the dowel of FIG. 1 expanded into a hard receiving material.

In FIG. 4 the expansion dowel as shown in FIG. 1, has been inserted into a bore hole 3 in a hard receiving material or the bore hole 3 has a relatively narrow diameter as compared to the outside diameter of the unexpanded dowel. With a conventional dowel it would not be possible to drive the expansion body 2 at all, due to the expansion dowel of the invention, however, the expansion body has a certain radial deformability and the recess 2b has been deformed so that it is completely closed permitting the expansion body to be completely driven into the sleeve for the extent of the dimension "s", similar to that shown in FIG. 3.

Figure 5:
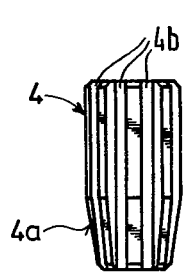
FIG. 5 is an elevational view of another embodiment of the expansion body used in the dowel shown in FIG. 1.
Figure 6:
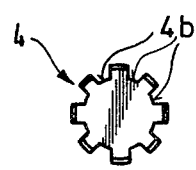
FIG. 6 is a top view of the expansion body illustrated in FIG. 5.

In FIG. 5 another embodiment of the expansion body 4 is disclosed. The front part of the expansion body 4 has the shape of a truncated cone 4a. The expansion body has a number of recesses 4b extending over its axial length and spaced apart about its circumferential surface. At least the upper cylindrical part of the expansion body has the appearance of a splined shaft. FIG. 6 provides a top view of the expansion body 4 of FIG. 5 showing the radially inwardly directed recesses 4b.

Figure 7:
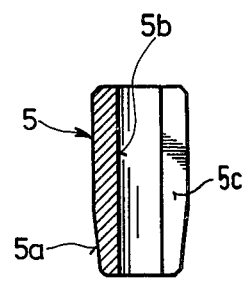
FIG. 7 is a sectional view of another embodiment of the expansion body.
Figure 8:
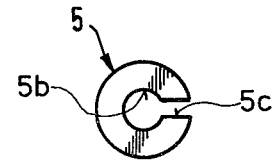
FIG. 8 is a top view of the expansion body displayed in FIG. 7.

FIG. 7 illustrates still another embodiment of the expansion body 5. The front part of the expansion body is shaped in the form of a truncated cone 5a. An axially extending bore 5b extends through the expansion body between its opposite ends. FIG. 8 provides a top view of the expansion body of FIG. 7. It can be noted in FIGS. 7 and 8 that a slot 5c directed radially inwardly through the expansion body 5 opens into the axial bore 5b.

Figure 9:
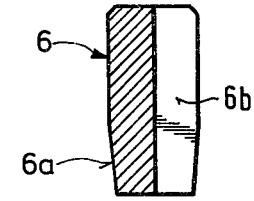
FIG. 9 is still another sectional view of an expansion body.
Figure 10:
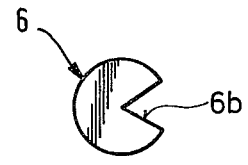
FIG. 10 is a top view of the expansion body illustrated in FIG. 9.

In FIG. 9 a still further embodiment of an expansion body 6 is shown. As with the other embodiments, the front part of the expansion body has the shape of a truncated cone 6a. In FIG. 10, which provides a top view of the expansion body 6 of FIG. 9, it can be seen that the expansion body has a V-shaped groove 6b with the junction of the legs of the V-shaped groove located substantially at the axial center of the expansion body.

While specific embodiments of the invention have been shown and described in detail to illustrate the application of the inventive principles, it will be understood that the invention may be embodied otherwise without departing from such principles.

What is claimed is:

1. Expansion dowel to be secured in a borehole in a hard receiving material of variable hardness comprising an axially extending sleeve having a first end and a second end, a bore extending therethrough from the first end to the second end, said sleeve being slotted for at least a portion of the axial length thereof from the first end toward the second end, said bore having tapered surfaces disposed in diverging relationship from the first end toward the second end of said sleeve, and an axially extending expansion body insertable into the bore in said sleeve in contact with the surface of the bore therein and being displaceable therethrough in the direction toward the first end of said sleeve for expanding said sleeve in the radial direction from the unexpanded condition into the expanded condition for securing said sleeve in the expanded condition in anchored engagement within the borehole and with said expansion body being retained in said bore, a part of said expansion body being deformable, said expansion body having a first end and a second end oriented in the same direction as the first and second ends of said sleeve and the outer surface of said expansion body tapering outwardly from the first end thereof for a portion of the axial length thereof toward said second end, wherein the improvement comprises that said sleeve consists of a first axially extending part extending from the first end thereof and a second axially extending part extending from the second end thereof and the opposite ends of said first and second parts spaced from the respective ends of said sleeve terminating in a common transverse plane intermediate the first and second ends of said sleeve, said first part of said sleeve having an axial length less than the depth of the borehole so that said first part is completely received in the borehole, the bore in the second part of said sleeve having a female thread for at least an axially extending portion thereof extending from the second end of said sleeve, said sleeve being slotted for at least a major portion of the axial length of said first part, said tapered surfaces of said bore being located in said first part of said sleeve, said expansion body being insertable into the bore in said sleeve through the second end thereof and being movably displaceable through said second part without exerting any expanding effect on said second part of said sleeve, in the unexpanded condition of said sleeve the tapered outer surface of said expansion body being complementary to and in contact with the tapered surface within said bore at a position spaced from the first end of said sleeve so that by subsequently driving said expansion body toward the first end of said sleeve said first part thereof is expanded outwardly placing said sleeve in the expanded condition in anchored engagement in the borehole while said expansion body has a strength characteristic relative to said sleeve so that it remains in the undeformed condition, said expansion body has at least one axially extending recess formed therein and extending inwardly from the outer surface thereof and for substantially the full axial length thereof from the first end to the second end with said expansion body being deformable generally in the circumferential direction along the axial direction of said recess only after said expansion body has anchored said sleeve in the borehole so that the circumferential dimension of said recess can be reduced for reducing the circumferential dimension of said expansion body and permitting said expansion body to pass axially through said first part of said sleeve toward the first end thereof while retaining the anchored engagement of said sleeve and with substantially the full axial length of said expansion body remaining with the bore in said sleeve whereby in the anchored expanded condition of said sleeve said expansion body is displaceable through said bore for at least a predetermined distance from the second end thereof, and in the anchored expanded condition after a certain expansion pressure for achieving anchored engagement of said sleeve has been reached without deforming said expansion body, further force applied in the axial direction toward the first end of said sleeve against said expansion body causes it to deform along the recess therein permitting a reduction in the circumferential dimension of said expansion body and axially displacing said expansion body through said bore for at least the predetermined distance from the second end of said bore.

2. Expansion dowel, as set forth in claim 1, wherein said recess having a V-shaped cross section with the junction of the legs of the V-shaped recess located substantially at the axial center of said expansion body.

3. Expansion dowel, as set forth in claim 1, wherein said expansion body having an axially extending bore therein extending for at least a portion of the axial length thereof from the first end of said body and said recess opening into said bore therein.

* * * * *